United States Patent
Judkins, III

(10) Patent No.: US 6,351,601 B1
(45) Date of Patent: Feb. 26, 2002

(54) FAN SPEED CONTROL SYSTEM HAVING AN INTEGRATED CIRCUIT FAN CONTROLLER AND A METHOD OF USING THE SAME

(75) Inventor: Joseph James Judkins, III, Cedar Park, TX (US)

(73) Assignee: Micrel Incorporated, San Jose, CA (US)

( * ) Notice: Subject to any disclaimer, the term of this patent is extended or adjusted under 35 U.S.C. 154(b) by 0 days.

(21) Appl. No.: 09/256,841

(22) Filed: Feb. 24, 1999

(51) Int. Cl.[7] .............................................. H02P 5/168
(52) U.S. Cl. ....................... 388/815; 388/809; 318/254; 318/139
(58) Field of Search ................................ 388/805–815; 318/254, 439, 138, 139

(56) References Cited

U.S. PATENT DOCUMENTS

| | | | |
|---|---|---|---|
| 4,722,669 A | | 2/1988 | Kundert ........................ 417/32 |
| 5,184,025 A | * | 2/1993 | McCurry et al. ............. 307/66 |
| 5,197,858 A | | 3/1993 | Cheng .......................... 417/14 |
| 5,293,103 A | | 3/1994 | Hanna ......................... 318/268 |
| 5,492,273 A | * | 2/1996 | Shah ........................ 236/44 A |
| 5,526,289 A | | 6/1996 | Dinh et al. ................. 364/557 |
| 5,687,079 A | | 11/1997 | Bauer et al. ................ 364/175 |
| 5,802,555 A | * | 8/1998 | Shigeeda ..................... 711/106 |
| 5,825,972 A | * | 10/1998 | Brown ........................ 388/811 |
| 5,847,526 A | * | 12/1998 | Lasko et al. ................ 318/471 |
| 6,037,732 A | * | 3/2000 | Alfano et al. ............... 318/471 |

OTHER PUBLICATIONS

Jerry Steele: "Fan–Control Methods For Computers", *Electronic Design*, Jul. 21, 1997.

* cited by examiner

Primary Examiner—David S. Martin
(74) Attorney, Agent, or Firm—Skjerven Morrill MacPherson LLP; Brian D. Ogonowsky; Elaine H. Lo

(57) ABSTRACT

A fan speed control system for controlling the operation and speed of a fan is described. The fan speed control system includes a power control block for supplying an output voltage to the fan. An integrated circuit fan controller causes a resistor divider circuit to operably divide a selected portion of the output voltage. The integrated circuit fan controller comprises a data register which receives values indicative of control or speed operands from a host. A logic state machine translates these values into appropriate logic signals and provides the signals to the resistor divider circuit. A timing reference or an oscillator controls the proper sequencing and timing relationship of the logic state machine. To turn the fan on, the following sequence of steps occurs. The power control block is turned off causing the output voltage not to be supplied to the fan. The logic state machine controls the resistor divider circuit to divide the output voltage to be supplied to the fan. Thereafter, the power control block is enabled to supply the output voltage to the fan. The logic state machine, after an interval, controls the resistor divider circuit to divide up to selected portion of the output voltage to adjust the speed of the fan. To turn the fan off, the power control block is turned off followed by controlling the resistor divider circuit not to be capable of dividing any of the output voltage.

23 Claims, 7 Drawing Sheets

FAN SPEED CONTROL SYSTEM HAVING AN INTEGRATED CIRCUIT FAN CONTROLLER AND A METHOD OF USING THE SAME

BACKGROUND OF THE INVENTION

1. Field of the Invention

This invention relates to a speed control system for fans, and more particularly to an integrated circuit fan controller to control the operation and speed of direct current (DC) fans.

2. Description of the Related Art

Many modern electronic systems require forced air cooling to regulate their internal operating temperatures. Most commonly, fans, such as brushless DC fans, are utilized to control or adjust the internal operating temperature of electronic systems. In a sophisticated system, such as computers and computer related equipment, the internal operating temperature is a dynamic variable, constantly changing depending on the operation that the system is performing. Accordingly it is desirable to actively control and regulate the speed of the fan. The benefits for actively controlling the speed of the fan include longer fan life and lower acoustic noise.

A variety of solutions have been provided for controlling the speed of a fan, among them include systems implementing "bit-banging" and digital-to-analog converters (DAC) to control I/O lines digitally interfaced with a control circuit of a fan. "Bit-banging" is a commonly used term of art referring to the manipulation of individual I/O bits under the control of software to produce the desired pattern of logic states. The software, by manipulating a desired combination of the I/O lines, can vary the voltage supply to the fan. However, software manipulation of I/O lines is time consuming and expensive. Moreover, use of software is wasteful of system resources and prone to committing errors. DAC circuits require a mixed-signal or combination of analog and digital circuitry. Mixed-signal circuitry is generally expensive to design, produce, test and calibrate.

Accordingly, a fan control system is desired which improves and simplifies the use of digitally interfaced lines for controlling or adjusting the speed of a fan.

SUMMARY OF THE INVENTION

The present invention provides a fan speed control system configured to control the operation and speed of a fan (e.g., a brushless DC fan). The fan speed control system comprises a power control block for supplying an output voltage to the fan. The power control block can be a closed-loop regulator wherein a selected portion of the output voltage, referred to as a feedback voltage, is supplied back to the power control block. The power control block compares the feedback voltage to an internal reference voltage so as to maintain the output voltage at a desired level. A voltage $V_{DD}$, indicative of a logic one, is supplied to the power control block via a shutdown (SHDN) input terminal, thus enabling power control block to supply the output voltage.

The fan speed control system additionally comprises a resistor divider circuit interfaced with the power control block. The resistor divider circuit includes a plurality of I/O lines, each having a resistor connected thereto. The resistor divider circuit can selectively divide up the output voltage, thus controlling the operation and speed of the fan by varying the amount of voltage that the fan receives.

An integrated circuit fan controller is provided for driving—i.e., asserting and deasserting—the I/O lines of the resistor divider circuit. The integrated circuit fan controller comprises a logic state machine coupled to the I/O lines via drivers, which include buffers and transistors. A timing reference or an oscillator controls the proper sequencing and timing relationship of the logic state machine. A data register coupled to a host, via a data bus, receives values indicative of control or speed operands for the fan. The logic state machine translates these values and provides signals indicative of logic one or zero to selected drivers. Accordingly, the logic state machine causes the resistor divider circuit to selectively divide up the output voltage by driving (i.e., asserting or de-asserting) none, all, or a combination of the I/O lines.

The fan speed control system additionally includes a shutdown line coupled to the SHDN input terminal. The logic state machine is coupled to the shutdown line via a driver. The logic state machine, by providing a signal indicative of logic one to the driver, causes the driver to short the shutdown line to ground to prevent voltage $V_{DD}$ from being supplied to the power control block. As a result, the power control block is disabled and the output voltage is prevented from being supplied to the fan.

In accordance with another aspect of the present invention, a method is provided for turning on the fan and adjusting the speed to a selected level. The method comprises the following steps: causing the power control block not to supply an output voltage to the fan; controlling the resistor divider circuit to divide the output voltage to be supplied to the fan; causing the power control block to supply the output voltage to the fan; and controlling the resistor divider circuit to divide up to a selected portion of the output voltage.

In accordance with another aspect of the present invention, a method is provided for turning off the fan. The method comprises causing the power control block not to supply an output voltage to the fan, and controlling the resistor divider circuit not to divide any of the output voltage.

DESCRIPTION OF THE PREFERRED EMBODIMENT(S)

Figure 1:
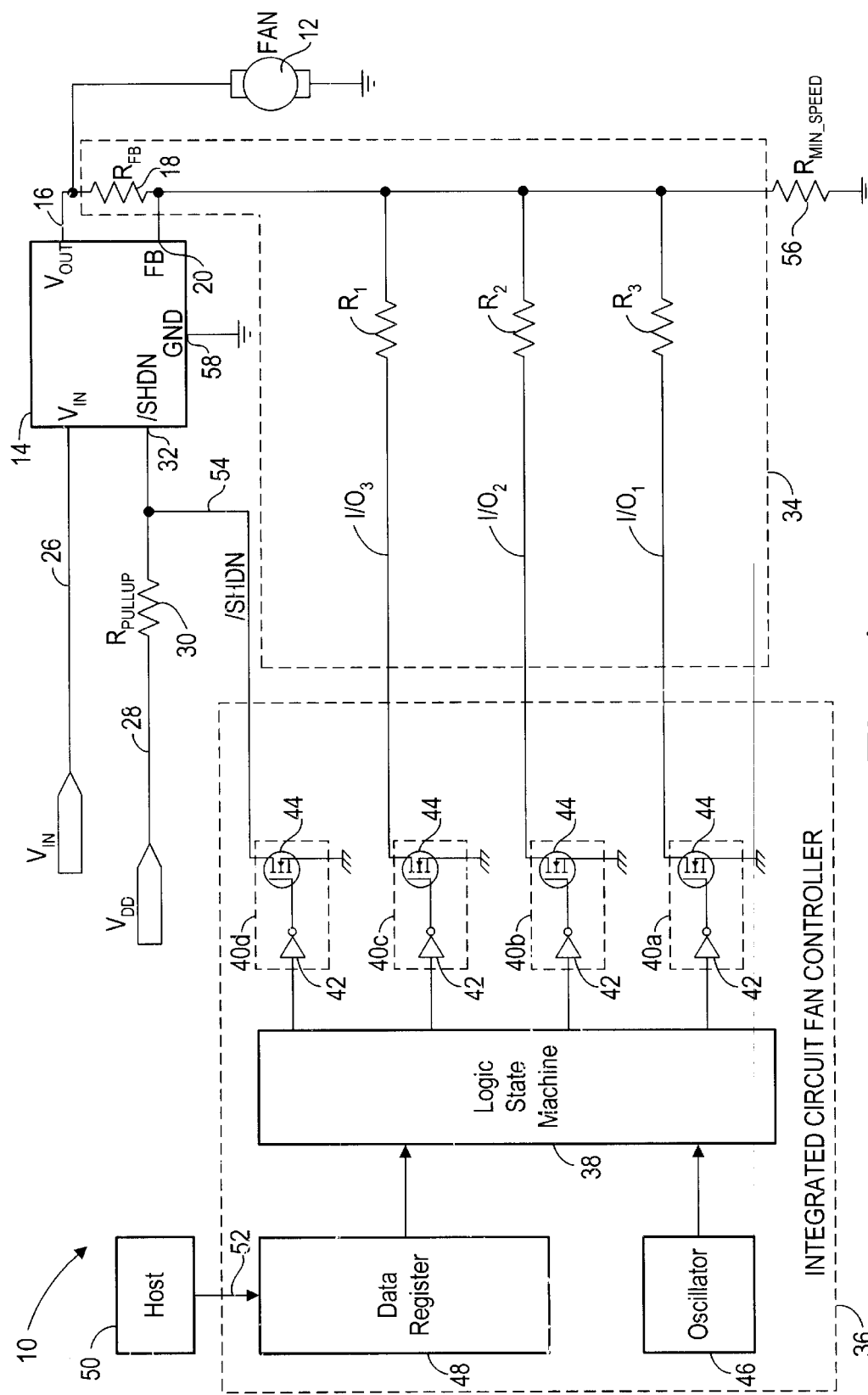
FIG. 1 is a schematic diagram of a fan speed control system in accordance with the present invention.
Figure 2:
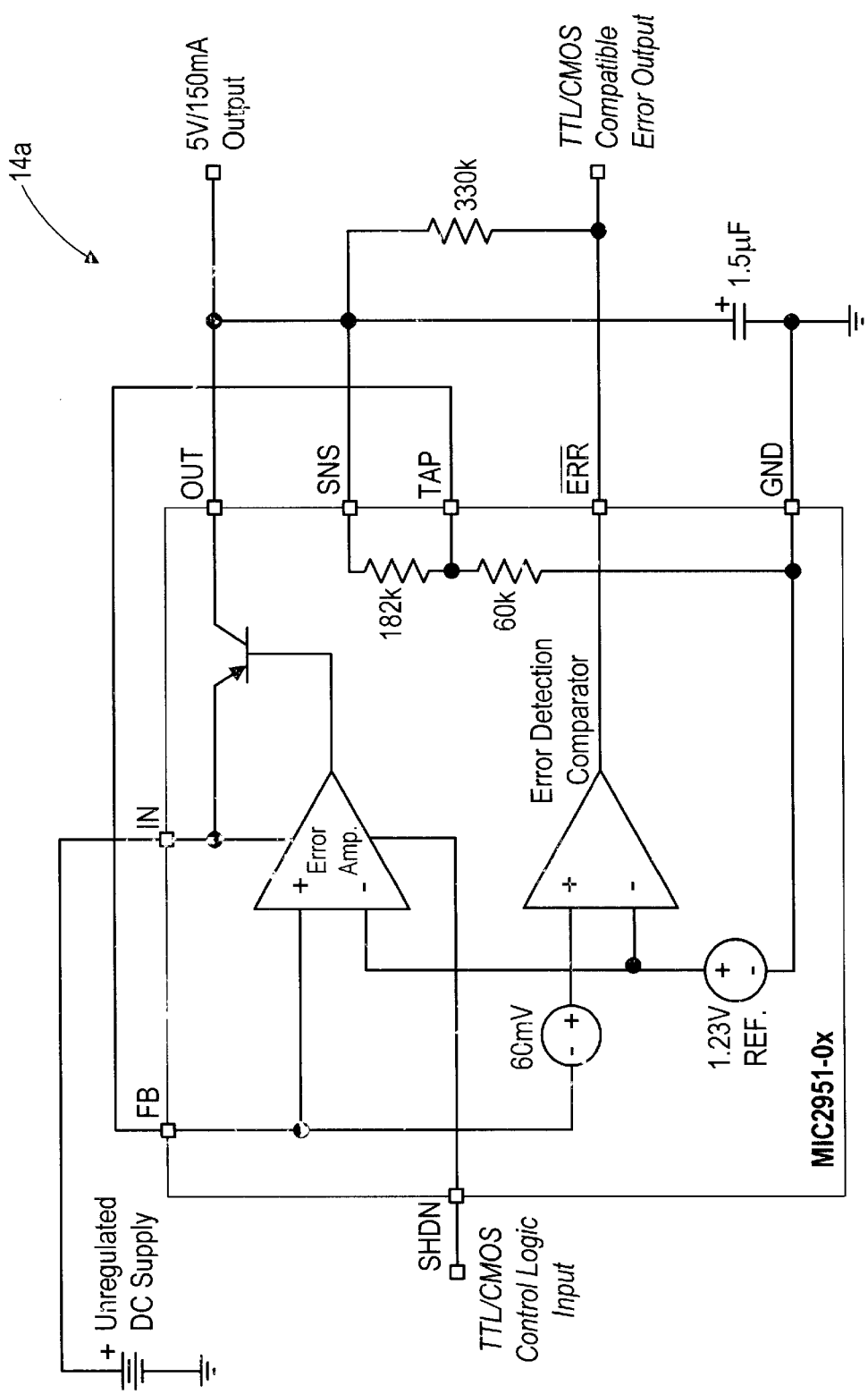
FIGS. 2 and 3 are schematic diagrams of different embodiments of a power control block for the fan speed control system.
Figure 3:
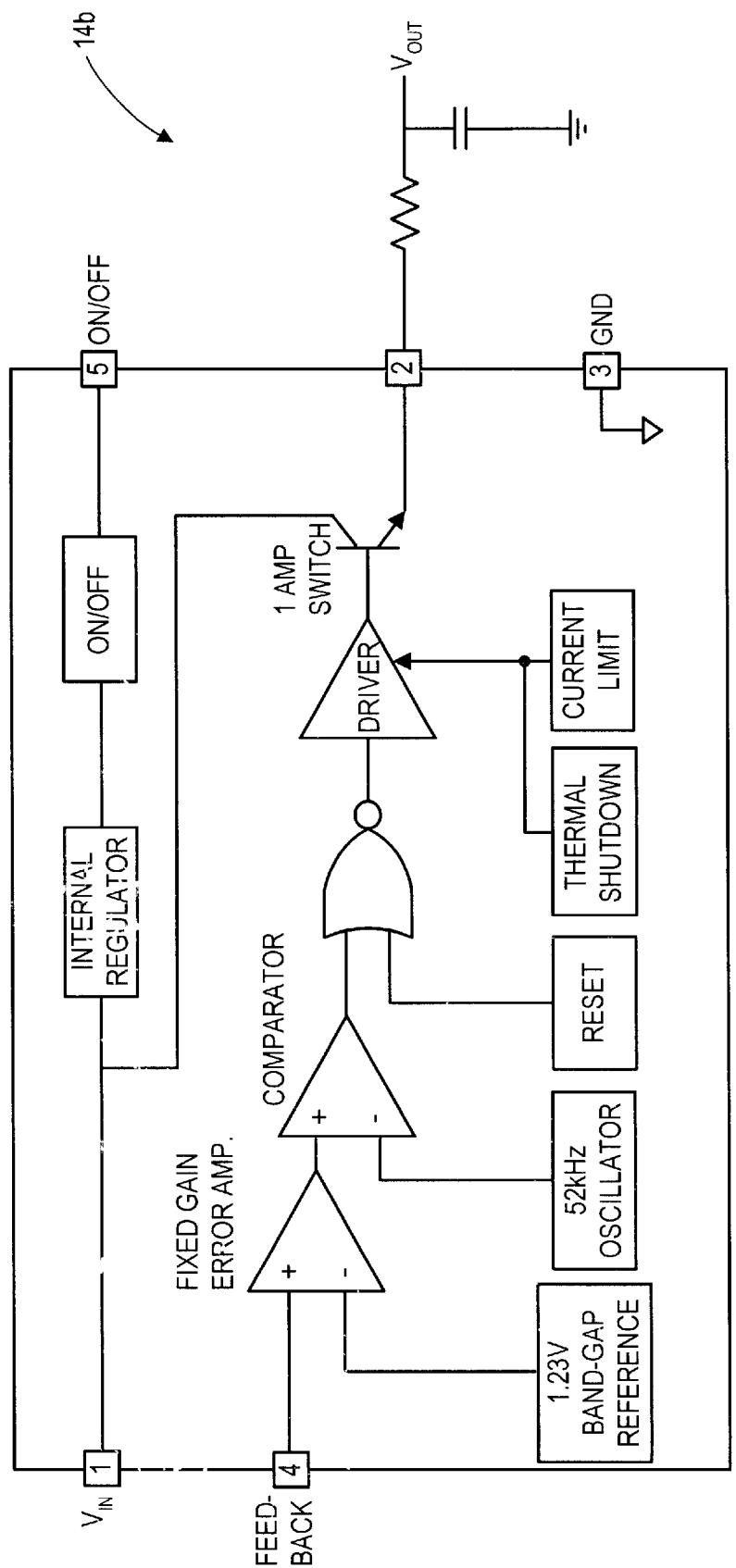
Figure 4:
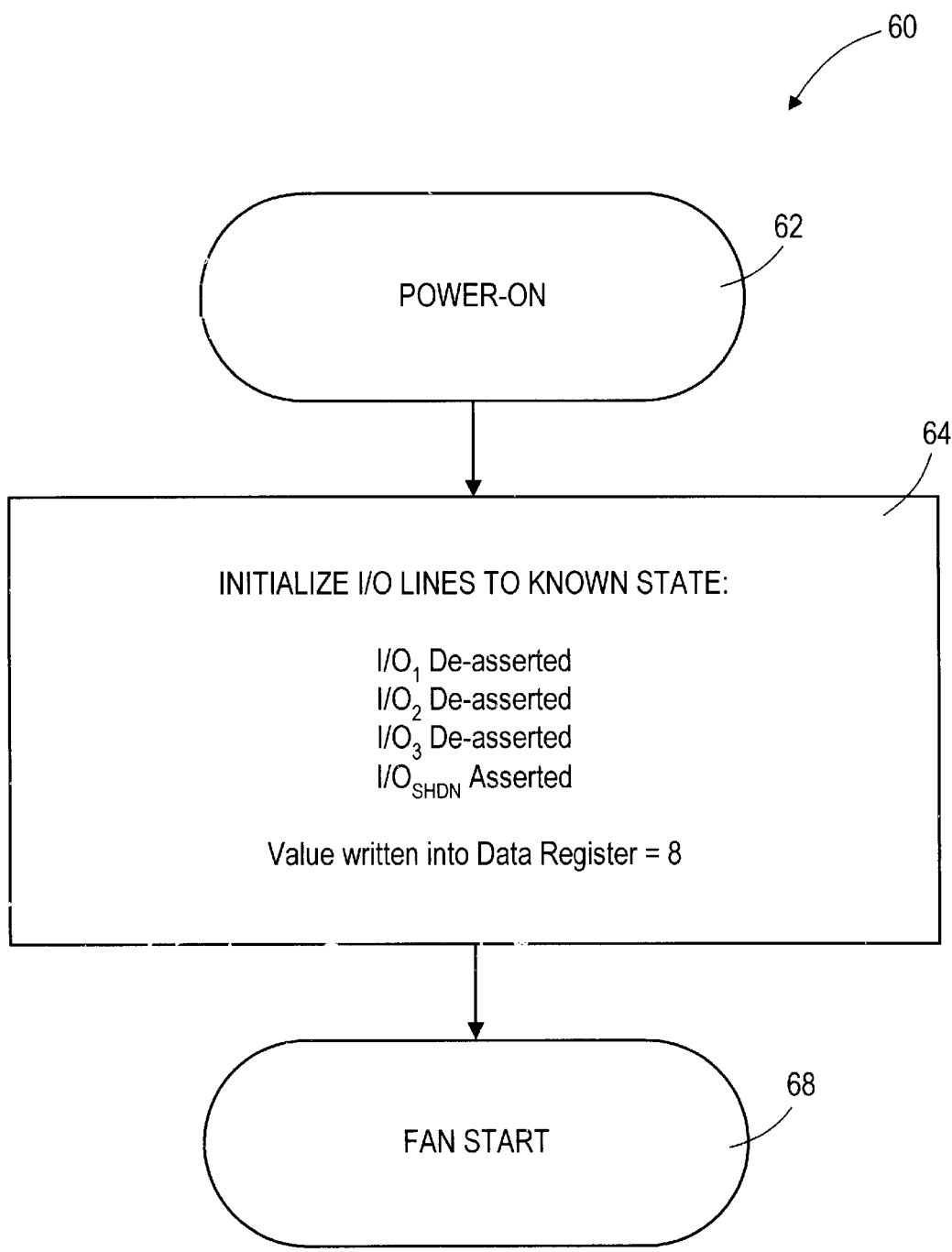
FIGS. 4–7 are flow charts illustrating the operation of a logic state machine for the fan speed control system.
Figure 5:
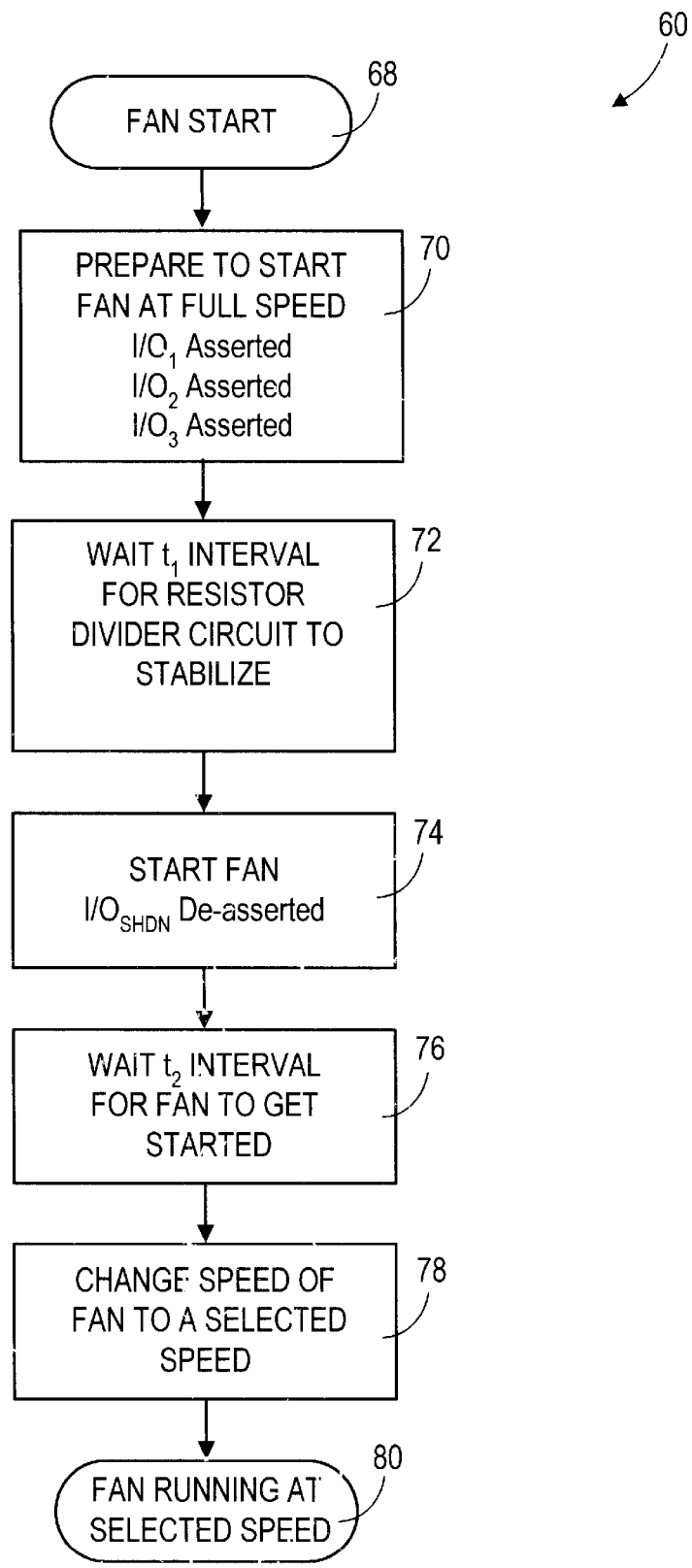

Referring in detail now to the drawings, wherein similar parts of the present invention are identified by like reference numerals, there is seen in FIG. 1 a fan speed control system, generally illustrated as 10. The fan speed control system 10 controls the operation and speed of a fan 12, such as a brushless DC fan utilized in various kinds of electronic systems, including personal computers. A power control block 14 supplies an output voltage $V_{out}$ to fan 12 via voltage output line 16. Power control block 14 can be implemented with a low-dropout linear regulator 14a as illustrated in FIG. 2 (e.g., model MIC29152, manufactured by Micrel Semiconductor Inc., San Jose Calif., hereinafter "Micrel"), or a switching regulator 14b as illustrated in FIG. 3 (e.g., model MIC4574, manufactured by Micrel). The various components of FIGS. 2 and 3 are expressed in conventional symbols which are readily understood by those skilled in the art. The switching voltage regulator of FIG. 3 varies the duty cycle of the switching transistor, and the pulsed output is filtered to output a DC voltage. It is understood that other switching regulators, such as a boost, flyback, or other suitable topology, may be used to implement the power control block 14 of the present invention.

Power control block 14 is preferably a closed-loop regulator wherein a selected portion of output voltage $V_{out}$, hereinafter referred to as a feedback voltage, is supplied back to power control block 14 via a feedback resistor $R_{FB}$ 18 and a feedback input terminal 20. Power control block 14 can also be implemented as an open-loop circuit as is well understood in the art. Power control block 14 compares the feedback voltage to an internal reference voltage so as to maintain output voltage $V_{out}$ at a desired level.

Power control block 14 includes a voltage input line 26 for supplying an input voltage $V_{in}$ (e.g., 12 V) to power control block 14. Input voltage $V_{in}$ is the power supply for fan 12. A voltage $V_{DD}$ ("high voltage"), indicative of a logic one, is supplied to power control block 14 via a control line 28 coupled to a shutdown (SHDN) input terminal 32. Providing a logic one to SHDN input terminal 32 enables power control block 14 to supply output voltage $V_{out}$ to fan 12. SHDN input terminal 32 is, therefore, the "On/Off" terminal of power control block 14 (see FIG. 3). A pull-up resistor 30 is disposed in control line 28. Pull-up resistor 30 prevents $V_{DD}$ from being directly shorted to ground when a shutdown line 54 is connected to ground.

A resistor divider circuit 34 is interfaced with power control block 14. FIG. 1 illustrates resistor divider circuit 34 comprising three control or I/O lines, generally referred to as $I/O_1$, $I/O_2$, and $I/O_3$. It is understood that any number of I/O lines may be employed with fan speed control system 10 of the present invention. For more fan speed levels, more I/O lines can be incorporated with the resistor divider circuit 34. Resistors $R_1$, $R_2$ and $R_3$ of I/O lines $I/O_1$, $I/O_2$, and $I/O_3$ are connected in parallel and each has a different resistance value (e.g. 3.5 kΩ, 1.8 kΩ, and 1 kΩ, respectively). Resistors $R_1$, $R_2$ and $R_3$, in conjunction with $R_{FB}$ resistor 18 (resistive value of, for example, 3 kΩ or 3.3 kΩ) can operably divide up to a selected portion of output voltage $V_{out}$, thus controlling the operation and speed of fan 12 by adjusting the amount of voltage that fan 12 receives. None, all, or a combination of I/O lines $I/O_1$, $I/O_2$, and $I/O_3$ may be asserted to cause resistors $R_1$, $R_2$ and $R_3$ (in conjunction with $R_{FB}$ 18) to divide up to a selected portion of output voltage $V_{out}$.

An integrated circuit fan controller 36 (e.g., model MIC74, manufactured by Micrel) is provided for driving—i.e., asserting or de-asserting—I/O lines $I/O_1$, $I/O_2$, and $I/O_3$ of resistor divider circuit 34. Integrated circuit fan controller 36 comprises a logic state machine 38 coupled to I/O lines $I/O_1$, $I/O_2$, and $I/O_3$ via drivers 40a, 40b, 40c, respectively. Logic state machine 38 can be implemented, for example, in discrete logic, as a programmable logic device (PLD), a complex programmable logic device (CPLD), a gate-array, a field programmable gate array (FPGA), an application-specific integrated circuit (ASIC), a programmable microprocessor or microcontroller using appropriate software, or by dedicated logic circuits inside a larger integrated circuit. One skilled in the art is familiar with creating state machines that sequence through any output configuration upon receiving certain inputs. Drivers 40a–40c each include a buffer 42 and a transistor 44. Each I/O line $I/O_1$, $I/O_2$, and $I/O_3$ can be individually programmed as an open-drain or complementary push-pull output. For fan control speed functions, however, I/O lines $I/O_1$, $I/O_2$, and $I/O_3$ are programmed as open-drain. A timing reference or oscillator 46 controls the proper sequencing and timing relationship of logic state machine 38 for turning fan 12 on and off in accordance with certain programming sequences, as will be described later in the application with reference to FIGS. 4–7.

A data register or a fan speed control register 48, accessible by a host 50 via a data bus 52 (e.g., an internal serial interface), receives values (e.g., a value from 0–7 in three-bit binary form) indicative of control and speed operands for fan 12. Host 50 may be a microprocessor. Logic state machine 38 translates the values written into data register 48 by host 50 to appropriate signals. Logic state machine 38 provides signals indicative of logic one or zero to selected drivers 40a, 40b, and 40c. Logic state machine 38 can cause all of the resistors $R_1$, $R_2$ and $R_3$ not to divide any of output voltage $V_{out}$, by de-asserting (i.e., supplying a logic one to drivers 40a–40c ) I/O lines $I/O_1$, $I/O_2$, and $I/O_3$. Similarly, logic state machine 38 can cause resistors $R_1$, $R_2$ and $R_3$ to divide a selected portion of the output voltage $V_{out}$ by asserting all or a combination of I/O lines $I/O_1$, $I/O_2$, and $I/O_3$ (i.e., supplying a logic zero to the selected drivers 40a–40c and coupling resistors $R_1$, $R_2$ and/or $R_3$ to ground). By dividing a selected portion of output voltage $V_{out}$, the speed of fan 12 can be adjusted.

Fan speed control system 10 additionally includes shutdown line 54 (hereinafter "$I/O_{SHDN}$ line"). $I/O_{SHDN}$ line 54 couples SHDN input terminal 32 of power control block 14 to a driver 40d of integrated circuit fan controller 36. By supplying a logic zero to driver 40d, logic state machine 38 turns on transistor 44 to assert or ground $I/O_{SHDN}$ line 54. Asserting $I/O_{SHDN}$ line 54 prevents voltage $V_{DD}$ from being supplied to SHDN input terminal 32. Accordingly, power control block 14 is disabled, and output voltage $V_{out}$ is prevented from being supplied to fan 12. Preventing power control block 14 from supplying output voltage $V_{out}$ to fan 12 provides a true "off" state for fan 12. To the contrary, by supplying a logic one to driver 40d, logic state machine 38 de-asserts $I/O_{SHDN}$ line 54, and thus enables power control block 14 to supply output voltage $V_{out}$ to fan 12.

The following Table I is an illustrative example of speeds of fan 12 that may be achieved by asserting/de-asserting none, all or a combination of I/O lines $I/O_1$, $I/O_2$, and $I/O_3$, including $I/O_{SHDN}$ line 54:

TABLE I

| Value of Logic Signal Applied to Buffers | | | | I/O Lines Asserted | | | | Fan Speed Selected |
|---|---|---|---|---|---|---|---|---|
| 40c | 40b | 40a | 40d | $I/O_3$ | $I/O_2$ | $I/O_1$ | $I/O_{SHDN}$ | |
| 1 | 1 | 1 | 0 | Yes | Yes | Yes | Yes | Fan Off |
| 1 | 1 | 1 | 1 | No | No | No | No | Lowest Speed |
| 1 | 1 | 0 | 1 | No | No | Yes | No | First Speed |
| 1 | 0 | 1 | 1 | No | Yes | No | No | Second Speed |
| 1 | 0 | 0 | 1 | No | Yes | Yes | No | Third Speed |
| 0 | 1 | 1 | 1 | Yes | No | No | No | Fourth Speed |
| 0 | 1 | 0 | 1 | Yes | No | Yes | No | Fifth Speed |
| 0 | 0 | 1 | 1 | Yes | Yes | No | No | Sixth Speed |
| 0 | 0 | 0 | 1 | Yes | Yes | Yes | No | Highest Speed |

An $R_{min\_speed}$ resistor 56 can also be provided to divide a selected portion of output voltage $V_{out}$ $R_{min\_speed}$ resistor 56 divides a selected portion of output voltage $V_{out}$ at power-up. Implementing $R_{min\_speed}$ resistor 56 as a divider insures that the I/O lines $I/O_1$, $I/O_2$, and $I/O_3$ are not subjected to the $V_{out}$ of the power control block 14 at power-up. Further structure of fan speed control system 10 includes a ground terminal 58 for the power control block 14.

FIGS. 4–7 illustrate a flow chart 60 for the operation of logic state machine 38. Flow chart 60 begins at step 62 with the application of voltages $V_{in}$ and $V_{DD}$ to power control block 14. As illustrated in step 64, logic state machine 38 causes a maximum value (e.g., "8" as shown) to be written into data register 48. Logic state machine 38 further causes I/O lines $I/O_1$, $I/O_2$, and $I/O_3$ to be de-asserted by providing a signal indicative of a logic one to the drivers 40a, 40b, and 40c, respectively, and causes $I/O_{SHDN}$ line 54 to be asserted by providing a signal indicative of a logic zero to the driver 40d. These actions initialize the I/O lines to a known state. Flow chart 60 proceeds to FAN START step 68, which includes the steps 70, 72, 74, 76, and 78 of FIG. 5.

At step 70 logic state machine 38 asserts each I/O line $I/O_1$, $I/O_2$, and $I/O_3$ (i.e., provides a logic zero to drivers 40a–40c and couples resistors $R_1$, $R_2$ and $R_3$ to ground). If any of the I/O lines $I/O_1$, $I/O_2$, and $I/O_3$ are de-asserted prior to or simultaneously with de-asserting $I/O_{SHDN}$ line 54, $V_{out}$ could potentially damage integrated circuit fan controller 36. In other words, the timing or real-time action of logic state machine 38 (i.e., asserting I/O lines $I/O_1$, $I/O_2$, and $I/O_3$ prior to de-asserting $I/O_{SHDN}$ line 54) serves to protect drivers 40a–40c of low voltage (e.g., 3–5 V) integrated circuit fan controller 36 from a potentially damaging high voltage $V_{out}$ (e.g., 12 V) of power control block 14.

As illustrated by step 72, logic state machine 38 waits for an interval of $t_1$ (e.g., 0.25 to 1.0 second, typically 0.45 second) so that resistor divider circuit 34 can stabilize. After the time interval $t_1$, as illustrated by step 74, logic state machine 38 de-asserts $I/O_{SHDN}$ line 54 by providing a logic one to driver 40d. Accordingly, output voltage $V_{out}$ is supplied to fan 12. At step 76, logic state machine 38 waits an interval of $t_2$ (e.g., 0.5 to 2.0 second, typically 0.9 second) prior to implementation of step 78. It is understood that values for $t_1$ and $t_2$ are illustrative and that other time limitations may be used in the present invention.

At step 78, logic state machine 38, if desired, adjusts the speed of fan 12 by asserting/de-asserting one, all, or a combination of I/O lines $I/O_1$, $I/O_2$, and $I/O_3$. The various possible combination of assertion of I/O lines $I/O_1$, $I/O_2$, and $I/O_3$ provides a variety of speed levels, all of which are illustrated by Table I above. Step 80 indicates that fan 12 is running at a selected speed.

Given that data register 48 contains its maximum value (e.g., "8"), the result of executing steps 68 through 80 will be that fan 12 is started and left running at its maximum speed. This action insures that a system (e.g., a personal computer) is supplied with maximum airflow until data register 48 is rewritten by host 50 with a lesser value than its maximum value.

Figure 6:
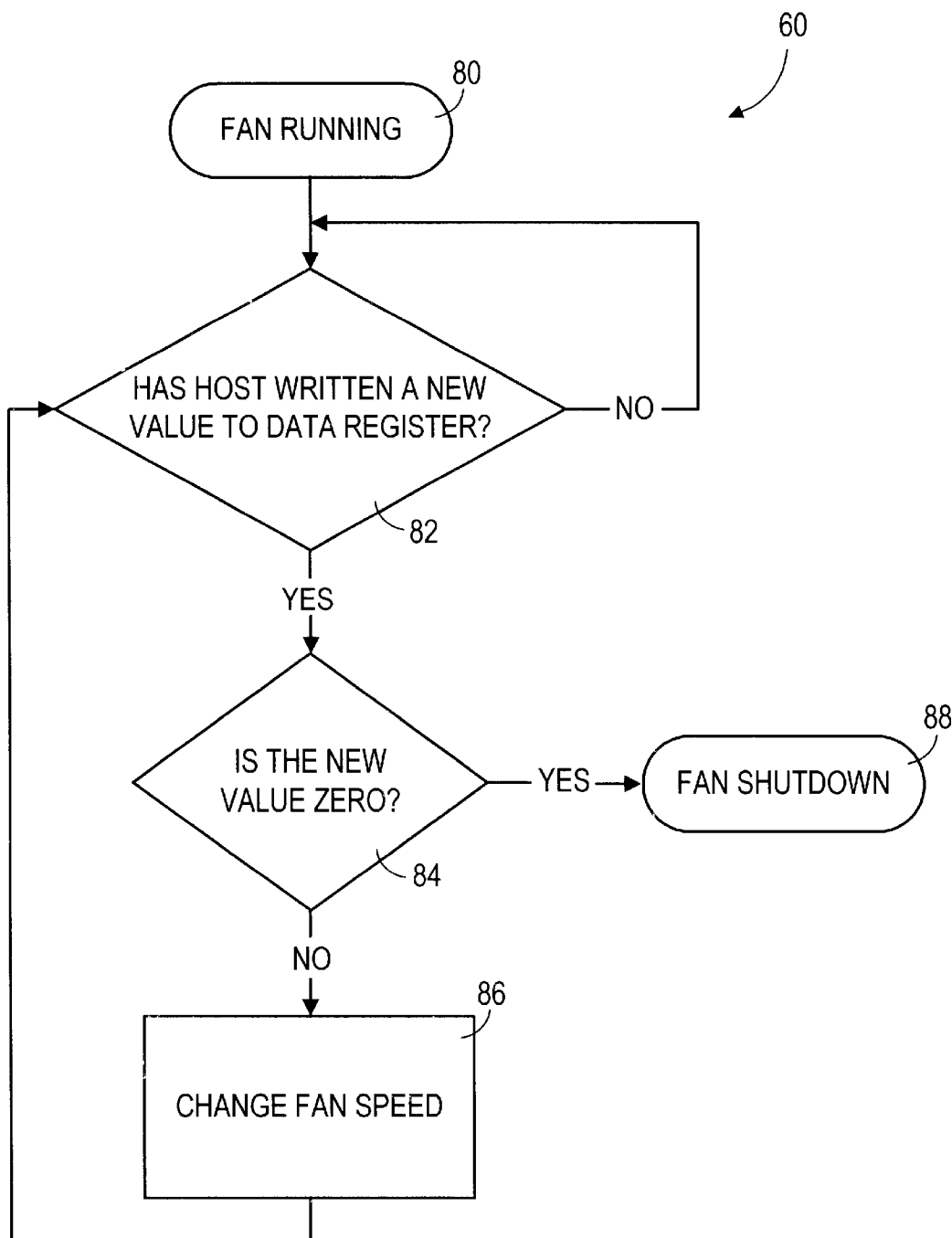

After the FAN RUNNING step 80, illustrated in FIG. 6, logic state machine 38 determines whether host 50 has written a new value to data register 48 (step 82). If no new value is written to data register 48, step 82 is repeated until a new numerical value is provided by host 50. If the numerical value is zero (step 84), logic state machine 38 implements FAN SHUTDOWN step 88 by asserting $I/O_{SHDN}$ line 54. If the numerical value received by data register 48 is a non-zero, at step 86, logic state machine 38 translates such values to the appropriate signals which cause resistor divider circuit 34 to adjust output voltage $V_{out}$. Steps 82, 84 and 86 are repeated until a zero numerical value is provided by host 50 to data register 48.

Figure 7:
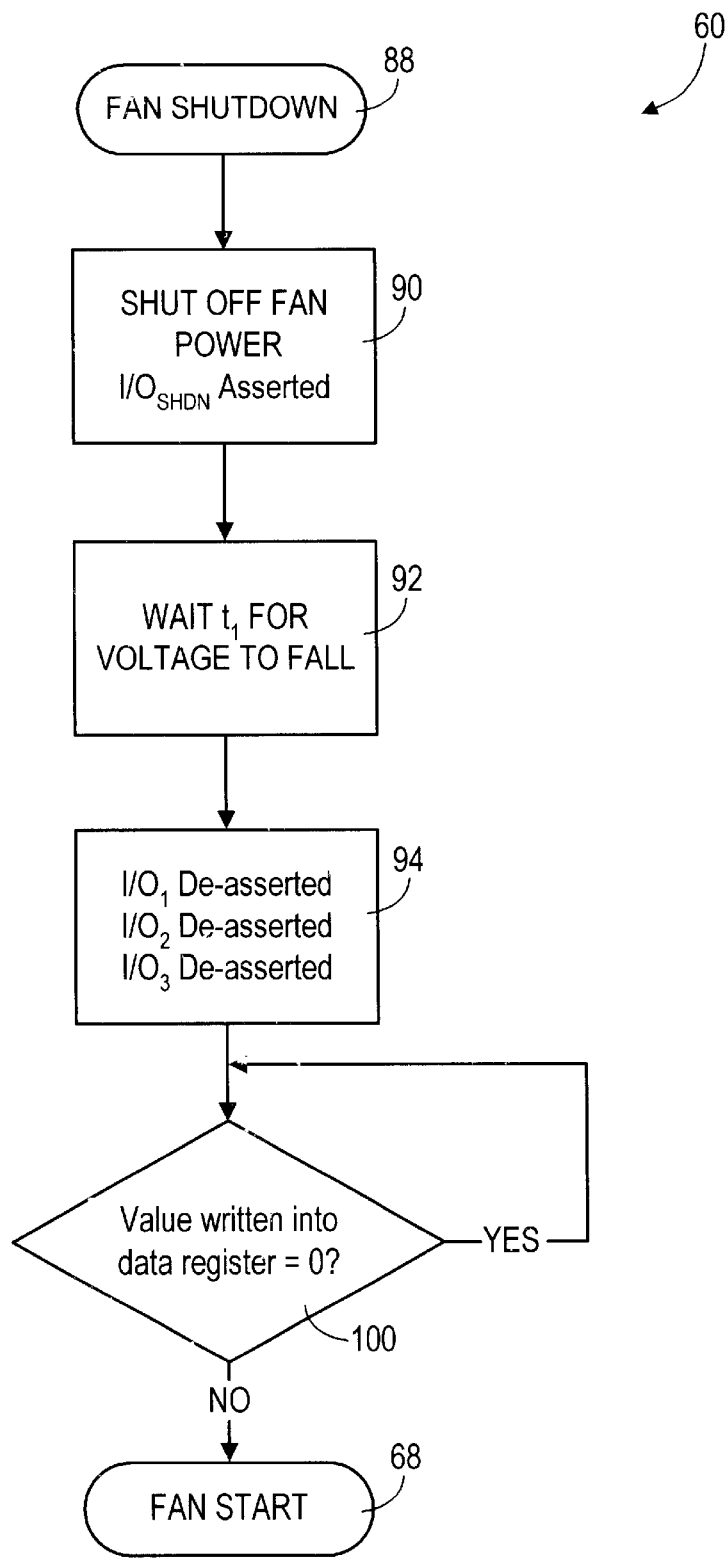

Referring to FIG. 7, FAN SHUTDOWN step 88 is initiated by logic state machine 38 asserting $I/O_{SHDN}$ line 54, as indicated in step 90. Power control block 14 is now in the true "off" state, and an energizing voltage is no longer supplied to fan 12. At step 92, oscillator 46 measures a time interval of $t_1$ (e.g., 0.25 to 1.0 second, typically 0.45 second) for allowing $V_{out}$ to dissipate. Thereafter, at step 94, logic state machine 38 de-asserts I/O lines $I/O_1$, $I/O_2$, and $I/O_3$. FAN START step 68 is not implemented until data register 48 receives a non-zero numerical value, as indicated by step 100. Step 100 is repeated until host 50 provides a non-zero value.

While particular embodiments of the present invention have been shown and described, it will be obvious to those skilled in the art that changes and modifications can be made without departing from this invention in its broader aspects and, therefore, the appended claims are to encompass within their scope all such changes and modifications as fall within the true spirit and scope of this invention.

What is claimed is:

1. A fan speed control system, comprising:
   (a) a power control block supplying an output voltage to a fan;
   (b) at least one control line interfaced with said power control block to operatively adjust said output voltage to said fan, said at least one control line comprising a resistor divider; and
   (c) a logic state machine coupled to said at least one control line, said logic state machine providing digital signals, in response to digital commands, to said at least one control line to cause said at least one control line to operably adjust said output voltage to said fan, said logic state machine selectively controlling said resistor divider to divide a selected portion of said output voltage by controlling said at least one control line to have a first signal level, and said logic state machine selectively controlling said resistor divider not to divide a selected portion of said output voltage by controlling said at least one control line to have a second signal level.

2. The fan speed control system of claim 1, additionally comprising a feedback voltage supplied to said power control block, wherein said power control block uses said feedback voltage to maintain said output voltage at a desired level.

3. The fan speed control system of claim 1, wherein said at least one control line comprises a resistor divider and a transistor coupled to said resistor divider, wherein said logic state machine selectively controls said resistor divider to divide a selected portion of said output voltage by controlling said at least one control line to have a first signal level, and wherein said logic state machine selectively controls said resistor divider not to divide a selected portion of said output voltage by controlling said at least one control line to have a second signal level.

4. The fan speed control system of claim 1, wherein said logic state machine changes the signal state of said at least one control line to the first signal level when said fan is being turned on.

5. The fan speed control system of claim 1, wherein said power control block comprises a shutdown input terminal communicating with a shutdown line, wherein said logic state machine, by changing a signal state of said shutdown line to said first signal level, prevents said power control block from supplying said output voltage, and by changing the signal state of said shutdown line to said second signal level, allows said power control block to supply said output voltage to said fan.

6. The fan speed control system of claim 5, wherein to start said fan from an off state said logic state machine causes said resistor divider to divide said output voltage to be supplied to said fan followed by changing the signal state of said shutdown line to the second signal level.

7. The fan speed control system of claim 5, wherein to shut off said fan said logic state machine changes the signal state of said shutdown line to the first signal level followed by changing the signal state of said at least one control line to the second signal level.

8. The fan speed control system of claim 1, additionally comprising a data register circuit coupled to said logic state machine and a host coupled to said data register circuit.

9. The fan speed control system of claim 1, additionally comprising an oscillator coupled to said logic state machine, said oscillator provides a timing reference for said logic state machine.

10. The fan speed control system of claim 1, additionally comprising a resistor coupled to said power control block for dividing a selected portion of said output voltage.

11. The method of claim 1, wherein said at least one control line includes three control lines.

12. A fan speed control system, comprising:
   (a) a power control block having an output voltage line coupled to a fan for supplying an output voltage to said fan;
   (b) an integrated circuit fan controller communicating with said power control block to vary said output voltage, said integrated circuit fan controller including a logic state machine, receiving digital commands, providing signals of a first signal level and a second signal level to control said output voltage; and
   (c) a resistor divider circuit interfacing said power control block to said integrated circuit fan controller, said integrated circuit fan controller causing said resistor divider circuit to divide up to a selected portion of said output voltage from said power control block.

13. The fan speed control system of claim 12, additionally comprising a resistor divider circuit interfacing said power control block to said integrated circuit fan controller, said integrated circuit fan controller causing said resistor divider circuit to divide up to a selected portion of said output voltage from said power control block.

14. The fan speed control system of claim 12, wherein said integrated circuit fan controller comprises at least one driver coupling said logic state machine to said resistor divider circuit, wherein said logic state machine provides a signal to said at least one driver to operably control said resistor divider circuit.

15. The fan speed control system of claim 12, wherein said resistor divider circuit comprises a feedback resistor and a plurality of resistors connected in parallel and communicating with said feedback resistor, wherein each of said resistors has a different resistance value.

16. The fan speed control system of claim 12, wherein said integrated circuit fan controller comprises a data register coupled to said logic state machine and an oscillator coupled to said logic state machine.

17. A method performed by a fan speed control system for controlling a fan, said fan speed control system having a power control block for supplying an output voltage to said fan and a resistor divider circuit including a plurality of control lines interfaced with said power control block for operably adjusting said output voltage to said fan, each control line having a resistor, said method comprising:
   (a) causing said power control block not to supply said output voltage to said fan;
   (b) controlling said resistor divider circuit to divide said output voltage to be supplied to said fan;
   (c) causing said power control block to supply said output voltage to said fan; and
   (d) controlling said resistor divider circuit to divide up to a selected portion of said output voltage by changing a signal state of one or more of said control lines to a first signal level or a second signal level, whereby a speed of said fan is adjusted to a selected level.

18. The method of claim 17, wherein said controlling step (d) comprises changing the signal state of a selected combination of said control lines to cause a selected combination of said resistors to divide a selected portion of said output voltage.

19. The method of claim 17, wherein said resistor divider circuit includes three control lines, wherein said controlling step (d) comprises changing the signal state of at least two of said control lines.

20. The method of claim 17, wherein said causing step (c) occurs at a selected time interval after said controlling step (b).

21. The method of claim 17, wherein said controlling step (d) occurs at a selected time interval after said causing step (c).

22. The method of claim 16, wherein the resistor divider circuit includes a shutdown line, and further comprising:
   (e) causing the power control block not to supply said output voltage to said fan by changing a signal state of said shutdown line from a second signal level to a first signal level; and
   (f) changing a signal state of each of said control lines to a second signal level.

23. The method of claim 22, wherein said controlling step (b) occurs at a selected time interval after said causing step (a).

* * * * *